(12) United States Patent
Gallacher

(10) Patent No.: US 7,333,224 B2
(45) Date of Patent: Feb. 19, 2008

(54) SYSTEM AND METHOD FOR MANAGING PRINTED DOCUMENTS

(75) Inventor: Michael D. Gallacher, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 10/163,987

(22) Filed: Jun. 5, 2002

(65) Prior Publication Data

US 2003/0227647 A1 Dec. 11, 2003

(51) Int. Cl.
*G06F 15/00* (2006.01)

(52) U.S. Cl. .................... 358/1.15; 358/1.13; 235/461; 235/462.01; 235/472.01; 235/486; 271/176; 271/278; 271/298

(58) Field of Classification Search ................ 358/462, 358/1.15, 1.13; 271/298, 176, 278; 235/478.01, 235/461, 462.01, 472.01, 486
See application file for complete search history.

(56) References Cited

U.S. PATENT DOCUMENTS

| | | | |
|---|---|---|---|
| 5,435,544 A | * | 7/1995 | Mandel ...................... 271/298 |
| 5,898,592 A | * | 4/1999 | Salgado et al. ............. 700/214 |
| 6,137,967 A | * | 10/2000 | Laussermair et al. ......... 399/16 |
| 6,213,652 B1 | * | 4/2001 | Suzuki et al. ............... 358/1.15 |
| 6,321,992 B1 | * | 11/2001 | Knowles et al. ........ 235/462.01 |

OTHER PUBLICATIONS

Anonomyous; "Solution Targets On-Line Job Submission"; Graphic Arts Monthly Jul. 2001; p. 65.

* cited by examiner

*Primary Examiner*—Twyler Lamb
*Assistant Examiner*—Vu Hang
(74) *Attorney, Agent, or Firm*—Merchant & Gould P.C.; Ryan T. Grace

(57) ABSTRACT

The present invention provides a system and method for managing printed documents. The method includes receiving a print request, assigning an identifier to a print job associated with the print request, and sending the print job to a printer for printing. Once the printer completes printing the print job, the identifier is added to an unretrieved print job queue. When a printed document associated with the print job is retrieved, the identifier associated with the printed document is scanned, such as with a bar code reader. Once the identifier is scanned, a retrieval confirmation is sent to indicate that the printed document has been retrieved. The identifier is then removed from the unretrieved print queue. Notification messages are sent to a notification recipient while the identifier is in the unretrieved print queue. The notification message includes an email message, a pop-up window, a pager message, and the like.

17 Claims, 6 Drawing Sheets

SYSTEM AND METHOD FOR MANAGING PRINTED DOCUMENTS

BACKGROUND OF THE INVENTION

Office environments typically have a local area network with several networked computer systems and one or more networked printers. Usually, for convenience, the networked printers are located in a central location. Individuals using the computer systems may submit a document, referred to as a print job, to one of the networked printers for printing. Once the print job has completed printing, the printed document is available for retrieval from the respective printer. In some environments, a notification may be sent to notify the individual, who submitted the print job, that the document has completed printing. While this type of notification is convenient if the individual can immediately retrieve the document, typically, however, the individual is working on several other tasks. Thus, the individual is likely to forget about the printed document. In fact, the same individual may later submit the same document for printing. When several print jobs do not get retrieved, the area around the printer becomes inundated with paper. In addition, the print jobs that do not get retrieved result in a waste of paper.

One approach in solving this problem is to assign an individual who is responsible for organizing the unretrieved print jobs. Unfortunately, this solution results in considerable overhead costs and still does not solve the problem of wasted paper. Another approach in solving this problem is to assign the individual an additional responsibility for distributing the completed print jobs. However, this approach is still less than an ideal solution to the problem.

SUMMARY OF THE INVENTION

The present invention provides a system and method for managing printed documents. Briefly, a retrieval notification message is sent to a notification recipient until the printed document has been retrieved from the printer. When the printed document is retrieved from the printer, an identifier associated with the printed document is scanned, which triggers a signal that indicates the printed document has been retrieved. More specifically, the method includes receiving a print request, assigning an identifier to a print job associated with the print request, and sending the print job to a printer for printing. Once the printer completes printing the print job, the identifier is added to an unretrieved print job queue. Thus, the unretrieved print job queue is used to maintain a list of print jobs that have printed out, but have not yet been retrieved. When a printed document associated with the print job is retrieved, the identifier associated with the printed document is scanned, with some device such as a bar code reader. Once the identifier is scanned, a retrieval confirmation is sent to stop further notifications from being sent. The identifier is then removed from the unretrieved print queue. In order to encourage retrieval of the printed document, one or more notification messages are sent to a notification recipient while the identifier is in the unretrieved print queue. The notification recipient may be the originator of the print request or may be another person, such as an assistant. The notification recipient may be identified within the print request or in a setup file. The notification message includes an email message, a pop-up window, a pager message, and the like.

DETAILED DESCRIPTION OF THE PREFERRED EMBODIMENT

Briefly stated, the present invention provides a system and method for managing printed documents so that the printed documents do not remain at the printer, but are rather retrieved. In general, the present invention includes a mechanism for maintaining a queue that identifies print jobs that have completed printing but have not yet been retrieved and includes a mechanism for identifying when a completed print job has been retrieved. Thus, the system and method of the present invention aids in reducing the amount of wasted paper by reminding individuals that their printed documents are available. These and other aspects of the invention will become apparent to those skilled in the art after reading the following detailed description.

Figure 1:
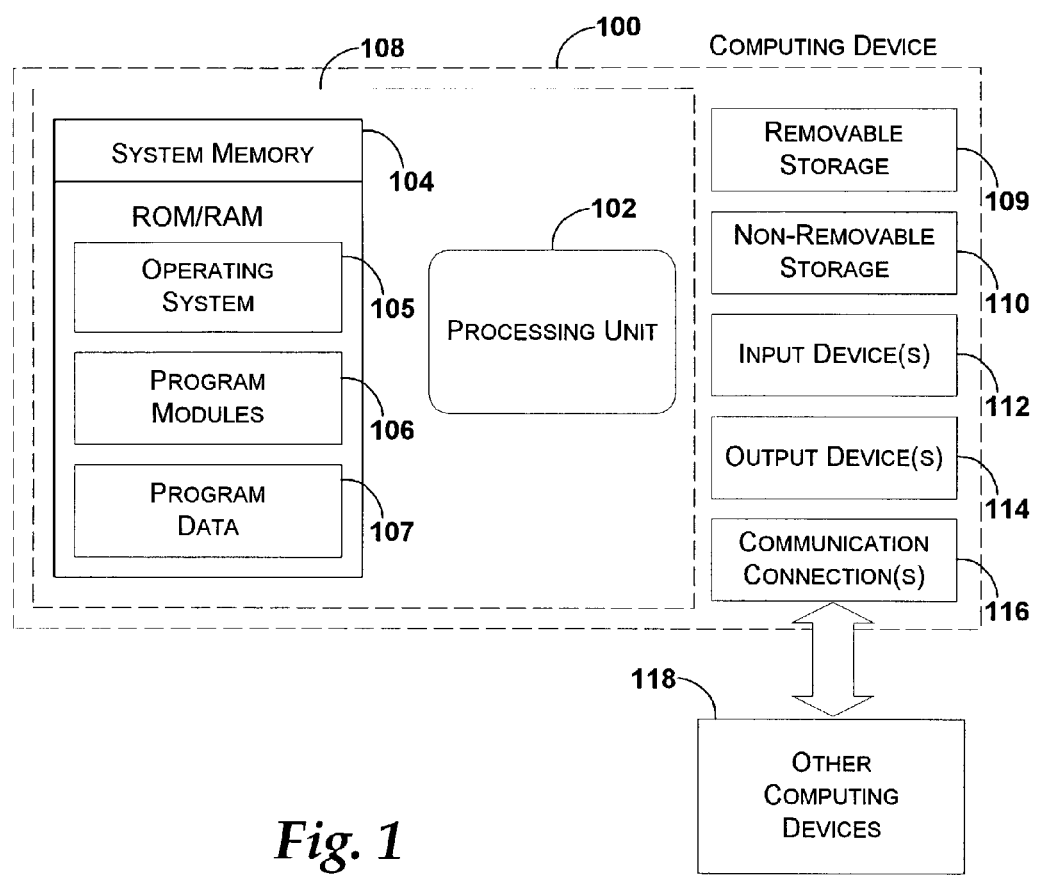
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Program modules 106 include email application and device drivers, such as printer device drivers. These program modules are well known in the art and need not be discussed at length here. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
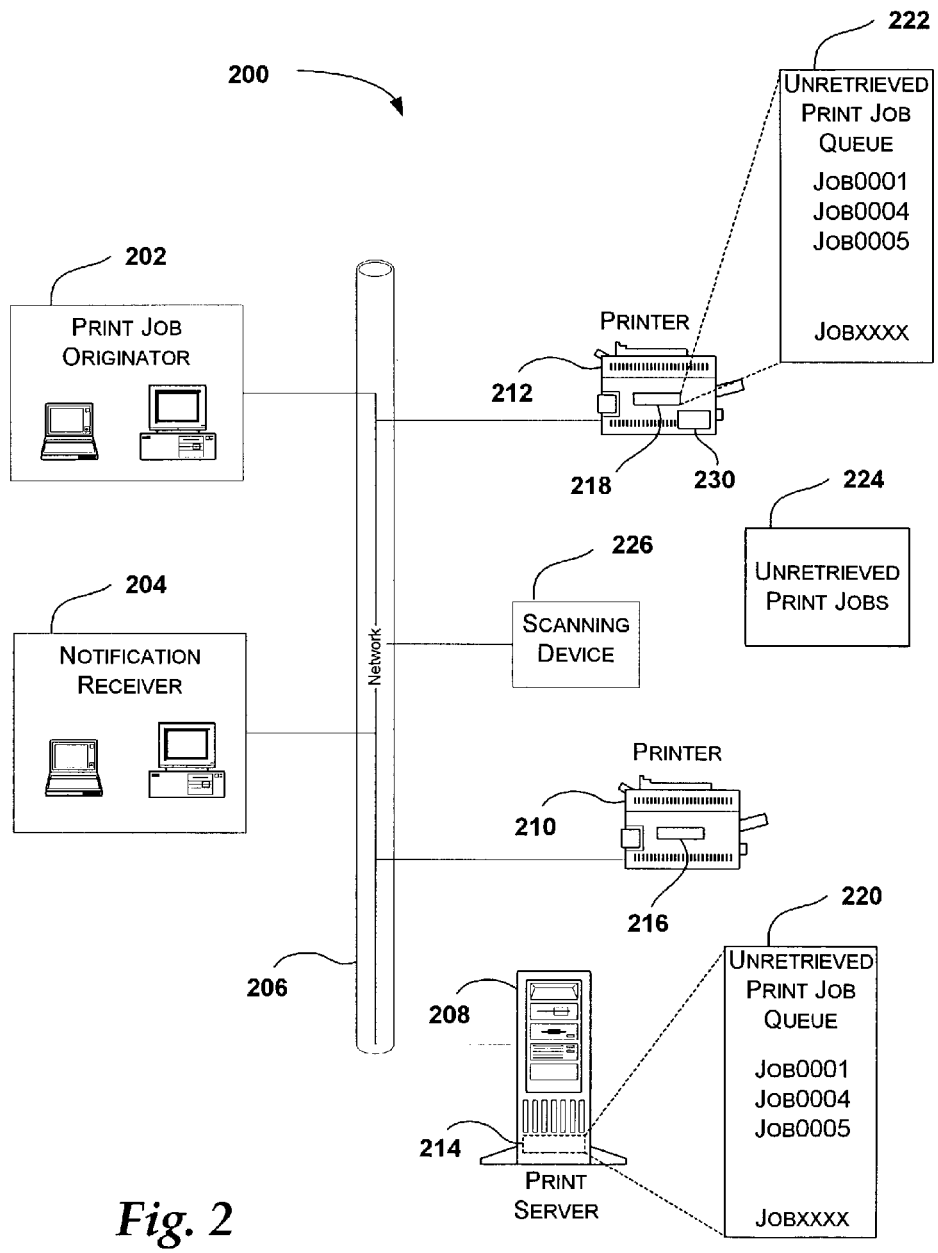
FIG. 2 is an exemplary computing environment in which the present invention may operate.

FIG. 2 is an exemplary computing environment in which the present invention may operate. As such, FIG. 2 illustrates a retrieval notification system 200 for managing printed documents. The retrieval notification system 200 includes a print job originator 202 and a notification receiver 204. The print job originator 202 and the notification receiver 204 may be separate devices, as shown, or may be the same device. Print job originator 202 and notification receiver 204 are computing devices such as the one described above in conjunction with FIG. 1. Thus, print job originator 202 and notification receivers 204 include desktop computers, laptop computers, personal digital assistants, and the like. Print job originator 202 and notification receiver 204 are connected over a network 206, such as a local area network (LAN) or a wide area network (WAN) that connects multiple LANs. Network 206 transmits information between computing devices and other devices connected to network 206.

In one embodiment of the present invention, retrieval notification system 200 further includes a print server 208. Print server 208 is a computing device such as the one described above in conjunction with FIG. 1. Print server 208 is connected to network 206 and is configured to manage one or more printers (e.g., printer 210). Typically, printer 210 is also on network 206, but may be coupled instead to print server 208 through an interface, such as parallel printer port LPT1. Print server 208 is configured to manage a print queue (not shown) for printer 210. The print queue maintains a status of pending print jobs submitted to printer 210. In addition, in accordance with the present invention, print server 208 also includes a document management process (represented within dashed box 214). Document management process 214 is configured to maintain an unretrieved job queue 220 and to send notifications. The notifications alert individuals that a printed document is available for retrieval. Document management process 214 is one of the program modules 106 on print server 208. The unretrieved job queue 220 represents print jobs that have completed printed, but have not yet been retrieved (i.e., unretrieved print jobs 224) associated with printer 210.

The retrieval notification system 200 also includes an identification device, such as scanning device 226. In one embodiment, scanning device 226 is a bar code reader. However, those skilled in the art will appreciate that other scanning devices may be used without departing from the present invention, such as a DATA MATRIX reader, or the like. As will be appreciated by those skilled in the art, scanning device 226 can be on network 206, attached directly to printer 210, integrated within a printer, or the like. Identification device is configured to recognize an identifier associated with the printed document and to send a signal that indicates retrieval confirmation upon recognizing the identifier. The retrieval confirmation is received by the document management process 214.

The scanning device 226 may operate as a stand-alone scanning device 226 (as shown) or scanning device 226 may be integrated into the printer, such as printer 212 having a scanning mechanism 230. In addition, printer 212 may include document management process 218 within the printer 212. In this embodiment, printer 212 is configured to maintain an unretrieved job queue 222 and is a computing device having components 108 such as the one described in conjunction with FIG. 1. Again, the unretrieved job queue 222 represents print jobs that have been printed, but have not yet been retrieved (i.e., unretrieved print jobs 224) associated with printer 212.

Figure 3:
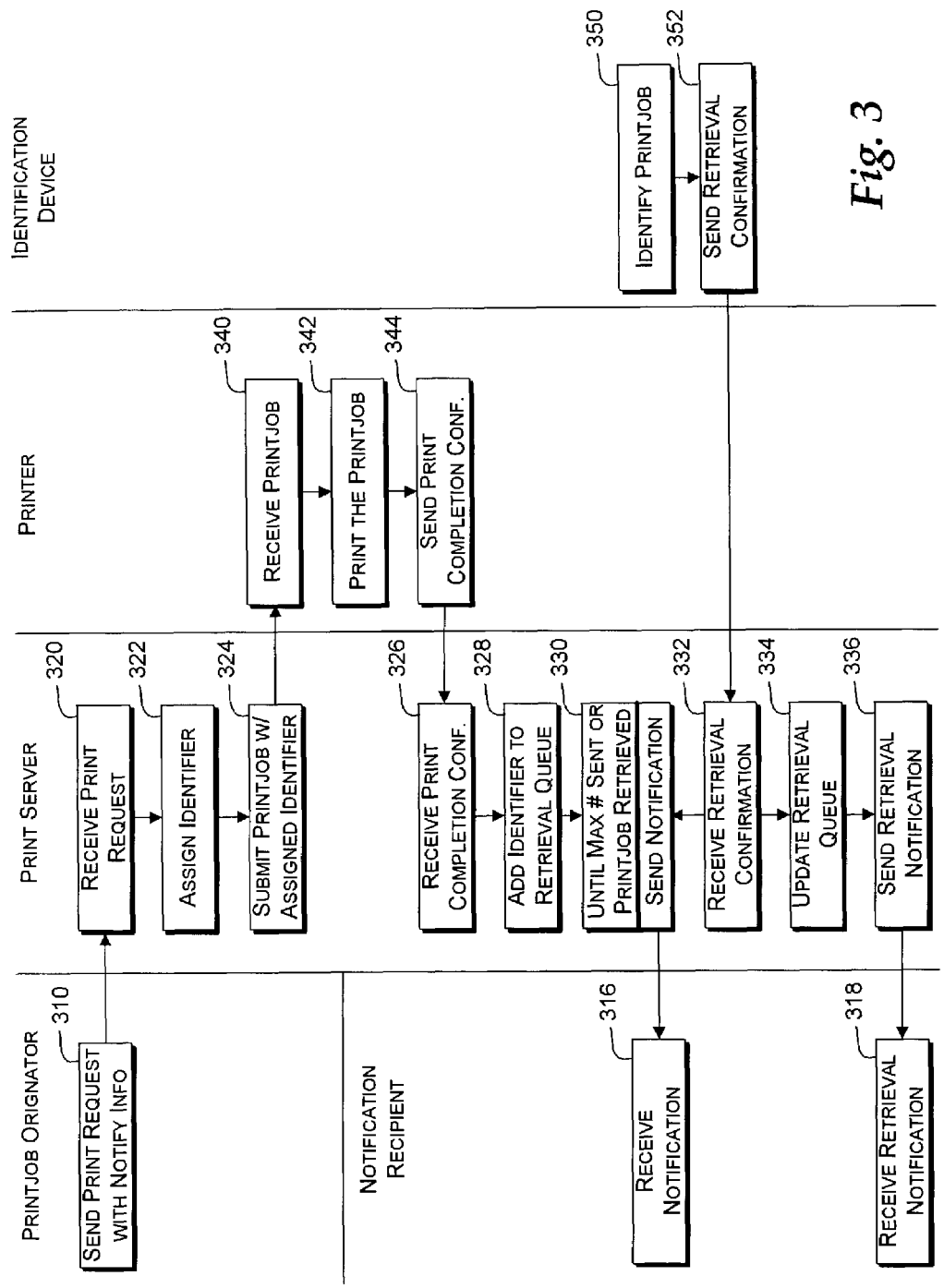
FIG. 3 is a process flow diagram illustrating a process for managing printed documents in accordance with the present invention.
Figure 4:
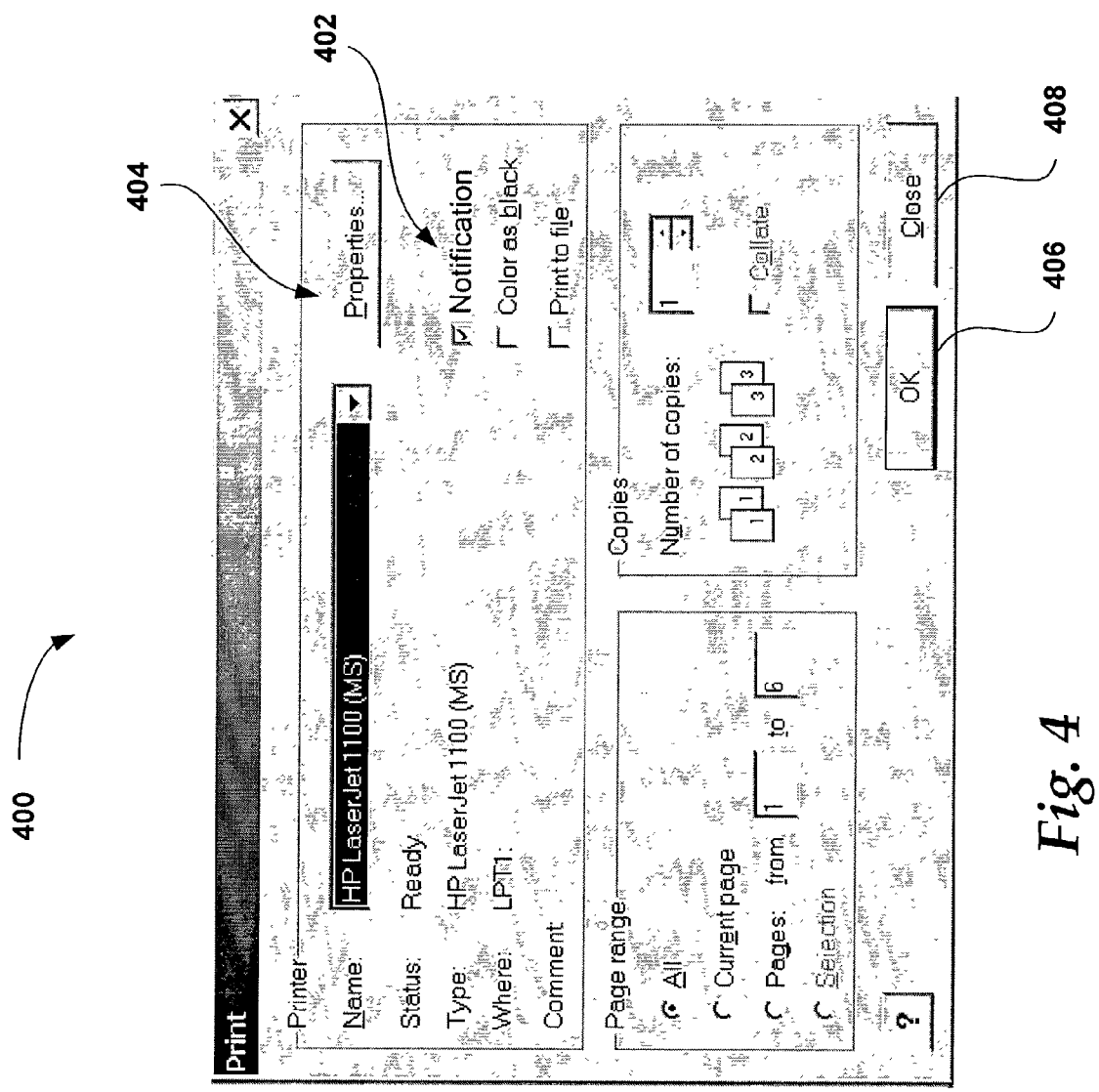
FIG. 4 is an exemplary user interface display for selecting characteristics of the notification in accordance with the present invention.
Figure 5:
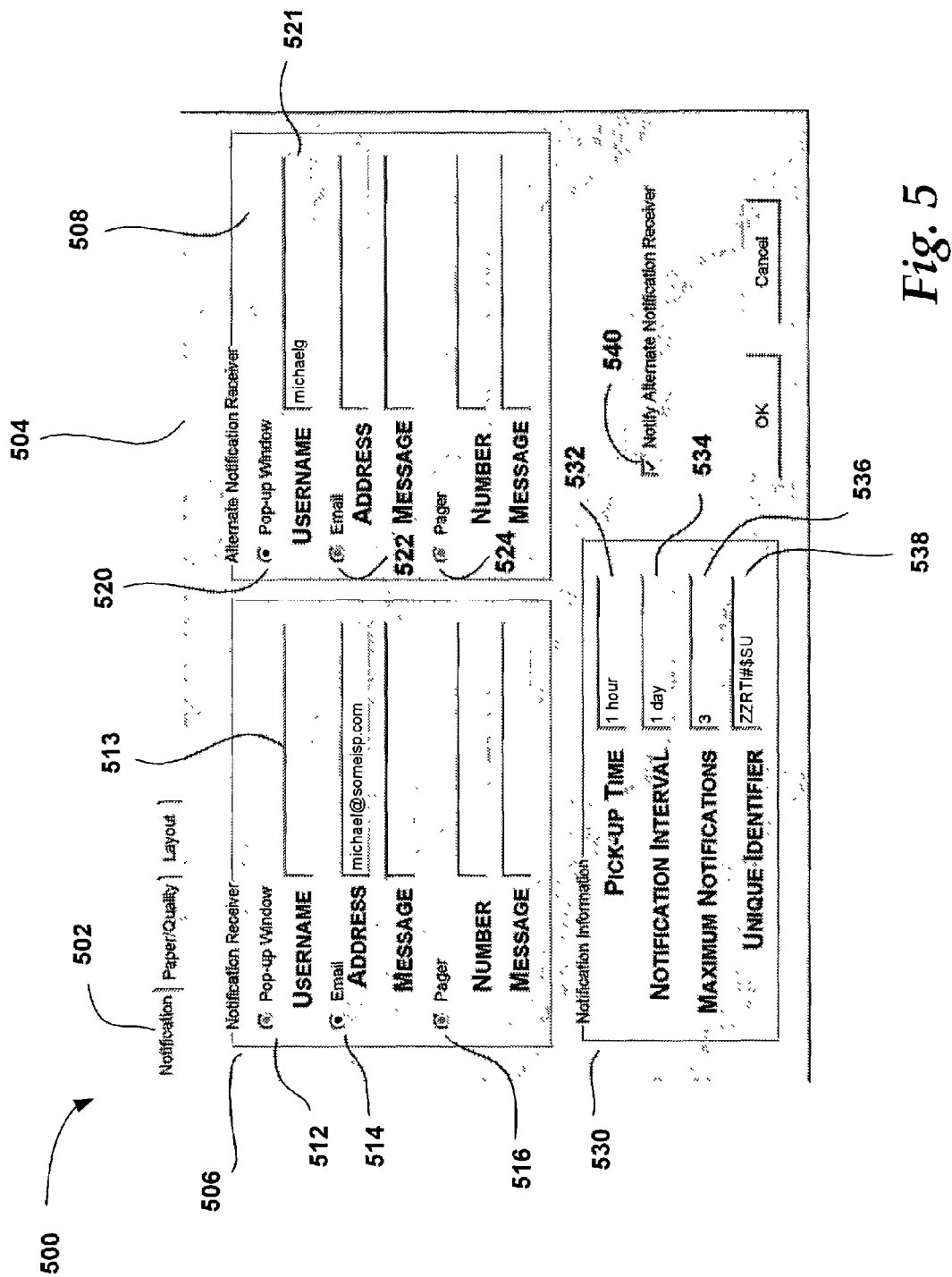
FIG. 5 is an exemplary user interface display for reminding an individual to retrieve a completed print job.

FIG. 3 is a process flow diagram illustrating one embodiment of a process for managing printed documents in accordance with the present invention. The process begins at block 310, where an application is executing and a document associated with the application is ready for printing. A print request is made from the application to print the document. One embodiment for requesting to print a document in accordance with the present invention is illustrated in FIGS. 4-5 and described below. In this embodiment, notification information is included within the print request. In general, the notification information may identify a notification receiver, an alternate notification receiver, and a method for notification, such as through email, by pop-up window, by phone or pager. Once the notification information has been configured for a specific document, the notification information may be used for subsequent print requests. As shown in FIG. 3, the print request originates from a print job originator and is sent to a print server at block 320.

At block 320, the print server receives the print request. In one embodiment, the print request is examined to determine whether notification information is included within the print request. If the print request does not include notification information, the print request is processed without retrieval notification using well-known methods for handling print requests and printing documents. However, if the print request includes notification information, processing continues at block 322 in accordance with the present invention.

At block 322, an identifier is assigned to a print job associated with the print request. The identifier uniquely identifies the print job and is capable of being recognized by the identification device. For example, the identifier may be a bar code, a DATA MATRIX, or the like. In one embodiment, the print server may generate the identifiers and then correlate the identifier with the print request from the print job originator. In another embodiment, the print job may supply an identifier. In this embodiment, because the supplied identifier may not be unique, the print server may append a unique portion to the identifier in order to have a unique identifier. Processing continues at block 324.

At block 324, the print job and the assigned identifier are sent for printing on a printing mechanism. Processing continues at block 340. At block 340, the printing mechanism (e.g., printer 210) receives the print job request 340. Processing continues at block 342 where the printing mechanism prints the assigned identifier and the associated document. The assigned identifier may be printed on a cover sheet associated with the document or on one or more of the pages of the document. Once the assigned identifier and the document have been printed, processing continues at block 344.

At block 344, the printing mechanism sends a print completion confirmation to the print server. This may occur when the printing mechanism completes printing or when the print server polls the printer to obtain pending jobs. Processing continues at block 326 where the print server receives the print completion confirmation. At this point, conventional notification systems send a print completion notification to the print job originator based on the print completion confirmation. However, if the print job originator is currently handling other tasks, the print completion notification can be inadvertently dismissed or simply ignored. Either way, the printed document may likely remain at the printer without being retrieved. However, as will be described below, the present invention focuses on the actual retrieval of the printed document and determines when to send notifications (i.e., reminders) based on when the printed document is actually recognized as retrieved. Thus, processing continues at block 328.

At block 328, the identifier is added to a retrieval queue (e.g., unretrieved print job queue 220). Thus, the retrieval queue maintains a list of all printed documents that have not yet been retrieved. Processing continues at block 330.

At block 330, a notification is generated and sent to a notification recipient. Various methods of sending the notification, described in detail below, may be implemented. For example, a pop-up window may appear on the display associated with the print job originator, similar to conventional print completion notifications currently well known in the art. In another embodiment, an email message may be generated using conventional email implementations. Further, more than of the various methods may be used for any one print request. The notifications will continue to be sent until a maximum number of notifications have been sent or until confirmation is received that the printed document has been retrieved. Processing continues at block 316 where the notification recipient receives the notification. As mentioned above, the notification recipient may be the print job originator or another individual. In addition, if the print job originator and the notification recipient are different, the notifications may be sent to both. Those skilled in the art will appreciate that various scenarios for sending notifications can be implemented. Processing remains at block 330 until the maximum number of notification have been sent or the document has been retrieved.

At block 350, processing for generating the retrieval confirmation begins. The print job is identified. For example, a bar code reader, using conventional methods, scans the bar code (i.e., identifier) that appears on the cover sheet associated with the printed document. Processing continues at block 352.

At block 352, the identification device (e.g., bar code reader) sends a signal (i.e., retrieval confirmation) to the print server. The signal indicates that the printed document has been retrieved. Typically, a driver associated with the identification device (e.g., bar code reader) is configured to generate the signal upon handling the reading of the bar code. Then, in accordance with the present invention, the driver may be configured to generate the retrieval confirmation. The retrieval confirmation includes the identifier that was just scanned. In one embodiment, the retrieval confirmation may be sent over the network. In another embodiment, the retrieval confirmation may be sent to another process within a printer/scanner device (e.g., printer 212). Those skilled in the art will appreciate that other methods for sending the retrieval confirmation may be implemented without departing from the scope of the present invention. Processing continues at block 332.

At block 332, the print server receives the retrieval confirmation. Once the print server receives the retrieval confirmation, an event is raised such that the print server can stop sending the notifications at block 330. The document management process, in conjunction with the operating system, may handle the event in any conventional manner. Processing continues at block 334.

At block 334, the retrieval queue is updated by removing the entry associated with the identifier. Those skilled in the art will appreciate that the entry may be the identifier or another value associated with the identifier. Processing then optionally continues to block 336 where a retrieval notification message is generated and sent to the notification recipient (block 318). Optional blocks 336 and 318 are helpful when another individual (not the notification recipient) retrieves (scans) the printed document. Optional blocks 336 and 318 provide notification to the notification recipient when someone else has retrieved the printed document. Processing is then complete.

While the print server and printer are shown separately in FIG. 3, one skilled in the will appreciate that the functionality provided by the print server may be included within the printer. In addition, the functionality provided by the identification device may be included within the printer. Other variations to the process flow diagram may also occur without departing from the scope of the present invention. For example, the notification recipient or the print job originator may be allowed to directly remove a print job from the unretrieved queue. This may be useful if the notification recipient retrieved the document, but failed to scan the cover page before leaving the printer area.

FIG. 4 illustrates an exemplary display for generating the print request in accordance with the one embodiment of the present invention. In this embodiment, a print dialog 400 appears on a display of the print job originator (print job originator 202 shown in FIG. 2). The print dialog 400 may be a standard print dialog available through an operating system or may be an application-specific print dialog associated with the executing application. Print dialog box 400 includes several standard elements, which are known in the art and need not be discussed at length here. In addition, print dialog box 400 includes a notification selection box 402 for requesting retrieval notification in accordance with the present invention. When the notification selection box 402 is checked, the application submits additional retrieval information in the print request upon selecting an OK button 406.

However, before selecting the OK button 406, a user inputs the retrieval information. One exemplary user interface for inputting the retrieval information is shown in FIG. 5. As shown, a properties dialog 500 appears in response to selecting a properties button 404 on print dialog 400 when the notification selection box 402 has been checked. The properties dialog 500 includes one or more tabs, one of which is a notification tab 502. The other tabs are conventional tabs, such as for specifying the layout and specifying paper/quality information. Upon selecting the notification tab 502, a notification information dialog 504 becomes active.

Notification information dialog 504 includes notification receiver information 506, alternate notification receiver information 508, and other notification information 530. The notification receiver information 506 and alternate notification receiver information 508 provide selections for specifying a method for notifying an individual and an alternate individual, respectively. As such, notification receiver information 506 may include radial buttons associated with each method (e.g., radial button 512-516) that correspond to a pop-up window, an email, and a pager notification, respectively. The method may have a corresponding input field for specifying pertinent information for that method, (e.g., username edit box 513 associated with the pop-up window radio button 512).

The alternate notification receiver is convenient in an office environment. For example, a manager may specify an assistant as the alternative individual if the manager knows that she will be unable to retrieve the print job in a specified time. In another example, the manager may specify the assistant as the notification receiver and the manager as the alternate notification receiver.

Notification information 530 may include a pick-up time field 532, a notification interval field 534, and a maximum notifications field 536. Pick-up field 532 is used to input a time period for sending a first notification. The time period begins when the print job has completed printing. Notification interval field 534 is used to input a time interval. The time interval represents the time between iterative notifications. Maximum notifications field 536 is used to input a maximum number of notifications. The maximum number identifies the number of notifications that will be sent to the notification receiver specified in the notification receiver information 506. In addition, notification information 510 may include a unique identifier field 538 that allows the print job originator to identify the print job. However, as mentioned above, because the identifier must be unique with respect to other print job submitted by other print job originators, the print server may append a unique portion to the entered identifier to make sure that each assigned identifier is truly unique. In one embodiment, a notify alternate notification receiver check box 540 is checked to enable input of the alternate notification receiver information 508.

Figure 6:
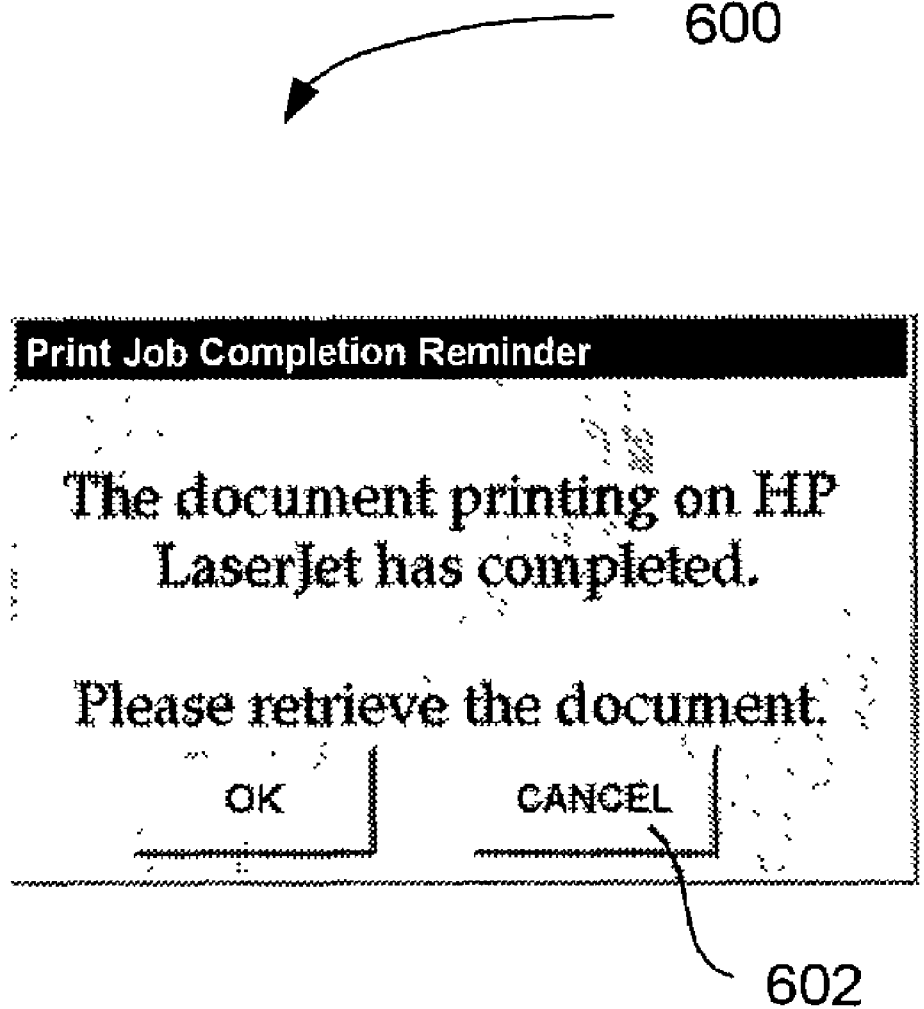
FIG. 6 is an exemplary user interface display for notifying the individual that the completed print job has been retrieved.

FIG. 6 illustrates an exemplary display for notifying the notification recipient that a printed document is available for retrieval. In this embodiment, a convention pop-up window 600 appears on a display of the notification recipient. Using convention method, an OK button is provided to delete the pop-up window 600. In another embodiment, a CANCEL button 602 is provided to allow the user to stop future notifications. As mentioned earlier, the notification may be sent by email, telephone, or paging devices. When the notification is sent by telephone or paging device, the system further may include a cellular network and paging network, respectively, configured in a conventional manner. The generation of the notification then uses the notification information specified in accordance with the present invention to send the notification over these other conventional mediums.

In another embodiment, the print server may have a default setting that specifies that each print request be managed in accordance with the present invention. As a further refinement to this embodiment, if the print request also includes notification information, the notification information included within the print request will override the default information. In this embodiment, the notification receiver, the alternate notification receiver, and the method for notification may be determined by reading a set-up file, a registry entry, or the like.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for managing printed documents, the method comprising:
    receiving a print request, wherein the print request includes a notification schedule for unretrieved print jobs and a notification recipient;
    assigning an identifier to a print job associated with the print request;
    sending the print job for printing;
    printing the print job having the identifier printed in association with the printed print job;
    upon receiving confirmation that the print job has completed printing, adding the identifier to an unretrieved print job queue to begin a notification procedure to send the notification recipient identified in the print request notification according to the notification schedule identified in the print request; and
    receiving confirmation that the print job has been retrieved from a scanning mechanism that detects the identifier associated with the printed print job, indicating that the print job has been retrieved by removing the identifier from the unretrieved print job queue and ending the notification procedure when the identifier has been removed from the unretrieved print job queue.

2. The computer-implemented method of claim 1, wherein the notification procedure further comprises periodically sending the notifications.

3. The computer-implemented method of claim 1, wherein the notification recipient is a print job originator associated with the print request.

4. The computer-implemented method of claim 1, wherein the print request includes a maximum number that specifies a number of the one or more notifications to send.

5. The computer-implemented method of claim 1, wherein the notification recipient is identified in set-up information.

6. The computer-implemented method of claim 1, wherein the identifier includes a bar code.

7. An apparatus for managing printed documents, the apparatus comprising:
    a processor;
    a memory into which a plurality of computer-executable instructions are loaded, the computer-executable instructions performing a method comprising:
    receiving a print request, wherein the print request includes a notification schedule for unretrieved print jobs and a notification recipient;
    assigning an identifier to a print job associated with the print request;
    sending the print job for printing;
    printing the print job having the identifier printed in association with the printed print job;
    upon receiving confirmation that the print job has completed printing, adding the identifier to an unretrieved print job queue to begin a notification procedure to send the notification recipient identified in the print request notification according to the notification schedule identified in the print request; and receiving confirmation that the print job has been retrieved from a scanning mechanism that detects the identifier associated with the printed print job, indicating that the print job has been retrieved by removing the identifier from the unretrieved print job queue and ending the notification procedure when the identifier has been removed from the unretrieved print job queue.

8. The apparatus of claim 7, wherein the notification procedure further comprises periodically sending the notifications.

9. The apparatus of claim 7, wherein the notification recipient is a print job originator associated with the print request.

10. The apparatus of claim 7, wherein the print request includes a maximum number that specifies a number of the one or more notifications to send.

11. The apparatus of claim 7, wherein the identifier includes a bar code.

12. The apparatus of claim 7, further comprising a printing mechanism and wherein the method further comprises printing the print job and the associated identifier in conjunction with the printing mechanism and sending the confirmation once printing is complete.

13. The apparatus of claim 12, further comprising a scanning mechanism, the method further comprising recognizing the associated identifier in conjunction with the scanning mechanism and sending the retrieval confirmation upon recognizing the associated identifier.

14. The apparatus of claim 13, wherein the scanning mechanism is a bar code reader and the associated identifier is a bar code.

15. A system for indicating retrieval of printed documents, the system comprising:
  a client configured to:
    send a print request to a print server, wherein the print request includes a notification schedule for unretrieved print jobs and a notification recipient for receiving notifications,
    receive unretrieved print job notifications from a print server, and display the unretrieved print job notifications received from the print server,
  a print server configured to:
    receive the print request from the client,
    obtain an identifier for the print request,
    send the print request to a printer for printing,
    receive a confirmation from the printer that the print job as completed printing,
    add the identifier to an unretrieved print job queue to begin a notification procedure for notifying the client of the unretrieved print job in accordance with the notification schedule of the print request,
    receive confirmation from the printer that the print job as been retrieved, and
    remove the identifier from the unretrieved print job queue to end the notification procedure, and
  a printer configured to:
    receive a print request from the print server, and
    send a confirmation to the print server that indicates that the print job has been retrieved.

16. The system of claim 15, wherein the printer includes a bar code reader for reading a bar code.

17. The system of claim 15, wherein the client, print server, and the printer are connected on a network.

* * * * *